(12) United States Patent
Pederson

(10) Patent No.: US 6,424,269 B1
(45) Date of Patent: *Jul. 23, 2002

(54) LED WARNING SIGNAL LIGHT AND LIGHT BAR

(75) Inventor: John C. Pederson, St. Cloud, MN (US)

(73) Assignee: 911 Emergency Products, Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,881

(22) Filed: Jun. 9, 2000

Related U.S. Application Data

(63) Continuation of application No. 09/169,871, filed on Oct. 12, 1998, now abandoned.
(60) Provisional application No. 60/062,559, filed on Oct. 21, 1997, and provisional application No. 60/094,803, filed on Jul. 31, 1998.

(51) Int. Cl.[7] ............................................. G08B 5/22
(52) U.S. Cl. .................. 340/815.45; 340/907; 362/249; 362/362; 362/800
(58) Field of Search .......................... 340/815.45, 907, 340/908; 362/249, 362, 800

(56) References Cited

U.S. PATENT DOCUMENTS

| | | |
|---|---|---|
| 3,701,043 A | 10/1972 | Suleeg et al. |
| 3,863,075 A | 1/1975 | Ironmonger et al. |
| 3,889,147 A | 6/1975 | Groves |
| 4,149,111 A | 4/1979 | Coates, Jr. |
| 4,243,985 A | 1/1981 | Quayle |
| 4,298,806 A | 11/1981 | Herold ........................ 250/504 |
| 4,301,461 A | 11/1981 | Asano |
| 4,319,306 A | 3/1982 | Stanuch |
| 4,342,944 A | 8/1982 | SpringThorpe |
| 4,390,931 A | 6/1983 | Gorick et al. |
| 4,598,198 A | 7/1986 | Fayfield |
| 4,615,131 A | 10/1986 | Wakatake |
| 4,630,180 A | 12/1986 | Muraki et al. |
| 4,630,183 A | 12/1986 | Fujita |
| 4,633,280 A | 12/1986 | Takasu |
| 4,654,629 A | 3/1987 | Bezos et al. |

(List continued on next page.)

FOREIGN PATENT DOCUMENTS

| | | |
|---|---|---|
| DE | 43 04 216 A1 | 2/1993 |
| DE | 297 12 281 U1 | 5/1996 |
| EP | 0 468 822 A2 | 7/1991 |
| EP | 0 531 184 A1 | 8/1992 |
| EP | 0 531 185 A1 | 8/1992 |
| EP | 0 596 782 A1 | 10/1993 |
| EP | 0 633 163 A1 | 7/1994 |
| EP | 0 896 898 A2 | 7/1998 |
| FR | 2 658 024 | 2/1990 |
| FR | 2 680 861 | 9/1991 |
| FR | 2 707 222 | 7/1993 |
| GB | 2 330 679 A | 10/1998 |

Primary Examiner—Julie Lieu
(74) Attorney, Agent, or Firm—Vidas, Arrett & Steinkraus

(57) ABSTRACT

A light emitting diode (LED) warning signal light, the warning signal light comprising an array of light sources configured on a light support and in electrical communication with a controller and a power supply, battery, or other electrical source. The warning signal light provides various colored light signals for independent use or use by an emergency vehicle. These light signals may include a stationary light, strobe light, revolving light, and an oscillating light. Additionally, the warning signal light may be capable of displaying symbols, reverse characters, or arrows. Preferably, rotating and oscillating light signals are produced by sequentially illuminating columns of LED's on a stationary light support. However, the warning signal light may also be rotated or oscillated via mechanical means. The warning signal light may also be transportable for easy connection to a stand such as a tripod for electrical connection to a power supply as a stand-alone warning signal.

50 Claims, 8 Drawing Sheets

U.S. PATENT DOCUMENTS

| | | |
|---|---|---|
| 4,703,219 A | 10/1987 | Mesquida |
| 4,716,296 A | 12/1987 | Bussiere et al. ............ 250/504 |
| 4,720,835 A | 1/1988 | Akiba et al. |
| 4,799,135 A | 1/1989 | Inukai et al. |
| 4,918,497 A | 4/1990 | Edmond |
| 4,929,866 A | 5/1990 | Murata et al. |
| 4,935,665 A | 6/1990 | Murata |
| 4,954,822 A | 9/1990 | Borenstein |
| 4,965,644 A | 10/1990 | Kawabata et al. |
| 4,966,862 A | 10/1990 | Edmond |
| 4,990,970 A | 2/1991 | Fuller |
| 5,027,168 A | 6/1991 | Edmond |
| 5,045,767 A | 9/1991 | Wakatake |
| 5,050,055 A | 9/1991 | Lindsay et al. ............. 362/293 |
| D324,921 S | 3/1992 | Stanuch et al. |
| 5,093,768 A | 3/1992 | Ohe |
| 5,097,397 A | 3/1992 | Stanuch et al. |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,187,547 A | 2/1993 | Niina et al. |
| 5,220,235 A | 6/1993 | Wakimizu et al. |
| 5,233,204 A | 8/1993 | Fletcher et al. |
| 5,235,498 A | 8/1993 | Van Dulmen et al. |
| 5,283,425 A | 2/1994 | Imamura |
| 5,313,187 A | 5/1994 | Choi et al. |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai et al. |
| 5,362,971 A | 11/1994 | McMahon et al. .......... 250/577 |
| 5,403,916 A | 4/1995 | Watanabe et al. |
| 5,406,095 A | 4/1995 | Koyama et al. |
| 5,419,065 A | 5/1995 | Lin |
| 5,420,444 A | 5/1995 | Sawase et al. |
| 5,475,241 A | 12/1995 | Harrah et al. |
| 5,482,896 A | 1/1996 | Tang |
| 5,491,350 A | 2/1996 | Unno et al. |
| 5,498,883 A | 3/1996 | Lebby et al. |
| 5,514,627 A | 5/1996 | Lowery et al. |
| 5,516,727 A | 5/1996 | Broom |
| 5,519,720 A | 5/1996 | Hirano et al. |
| 5,526,237 A | 6/1996 | Davenport et al. |
| 5,528,474 A | 6/1996 | Roney et al. |
| 5,567,036 A | 10/1996 | Theobald et al. |
| 5,569,939 A | 10/1996 | Choi |
| 5,575,459 A | 11/1996 | Anderson |
| 5,585,783 A | * 12/1996 | Hall ........................... 340/473 |
| 5,593,223 A | 1/1997 | Koizumi |
| 5,612,231 A | 3/1997 | Holm et al. |
| 5,625,201 A | 4/1997 | Holm et al. |
| 5,627,851 A | 5/1997 | Takahashi |
| 5,631,474 A | 5/1997 | Saitoh |
| 5,632,551 A | 5/1997 | Roney et al. |
| 5,634,711 A | 6/1997 | Kennedy et al. |
| 5,636,916 A | 6/1997 | Sokolowski |
| 5,656,829 A | 8/1997 | Sakaguchi et al. |
| 5,661,742 A | 8/1997 | Huang et al. |
| 5,674,000 A | 10/1997 | Kalley ........................ 362/293 |
| 5,694,112 A | 12/1997 | VannRox et al. |
| 5,697,175 A | 12/1997 | Schwartz |
| 5,705,047 A | 1/1998 | Lee |
| 5,707,891 A | 1/1998 | Izumi et al. |
| 5,739,552 A | 4/1998 | Kimura et al. |
| 5,739,592 A | 4/1998 | Rigsby et al. |
| 5,758,947 A | 6/1998 | Glatt |
| 5,760,531 A | 6/1998 | Pederson |
| 5,789,768 A | 8/1998 | Lee et al. |
| 5,793,062 A | 8/1998 | Kish, Jr. et al. |
| 5,804,822 A | 9/1998 | Brass et al. ................. 250/302 |
| 5,806,965 A | * 9/1998 | Deese ........................ 362/249 |
| 5,838,024 A | 11/1998 | Masuda et et al. |
| 5,838,247 A | 11/1998 | Bladowski |
| 5,848,837 A | 12/1998 | Gustafson |
| 5,929,788 A | 7/1999 | Vukosie |
| 5,931,562 A | 8/1999 | Arato ......................... 362/184 |
| 5,934,694 A | * 8/1999 | Schugt et al. .......... 280/33.991 |
| 5,975,714 A | 11/1999 | Vetorino et al. ............ 362/192 |
| 6,009,650 A | 1/2000 | Lamparter |
| 6,018,899 A | 2/2000 | Hanitz |
| 6,028,694 A | 2/2000 | Schmidt ..................... 359/264 |
| 6,095,661 A | 8/2000 | Lebens et al. .............. 362/184 |
| 6,102,696 A | 8/2000 | Osterwalder et al. ......... 433/29 |
| 6,159,005 A | 12/2000 | Herold et al. ................. 433/29 |
| 6,177,678 B1 | 1/2001 | Brass et al. .............. 250/461.1 |

* cited by examiner

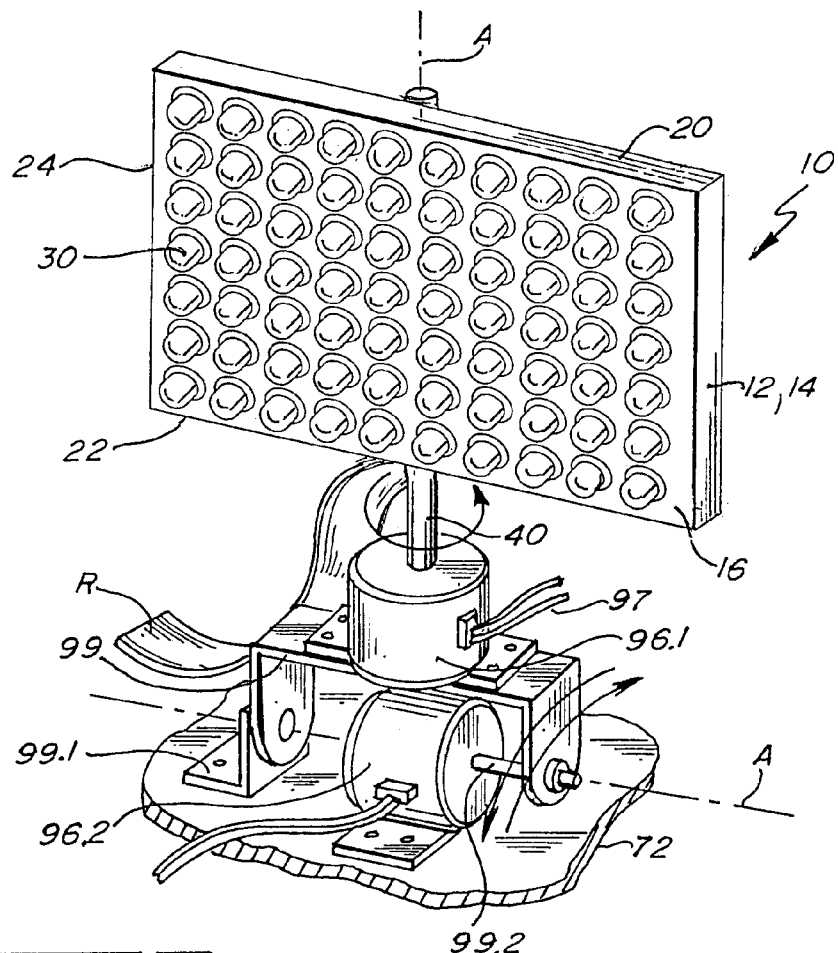
*Fig.3.*
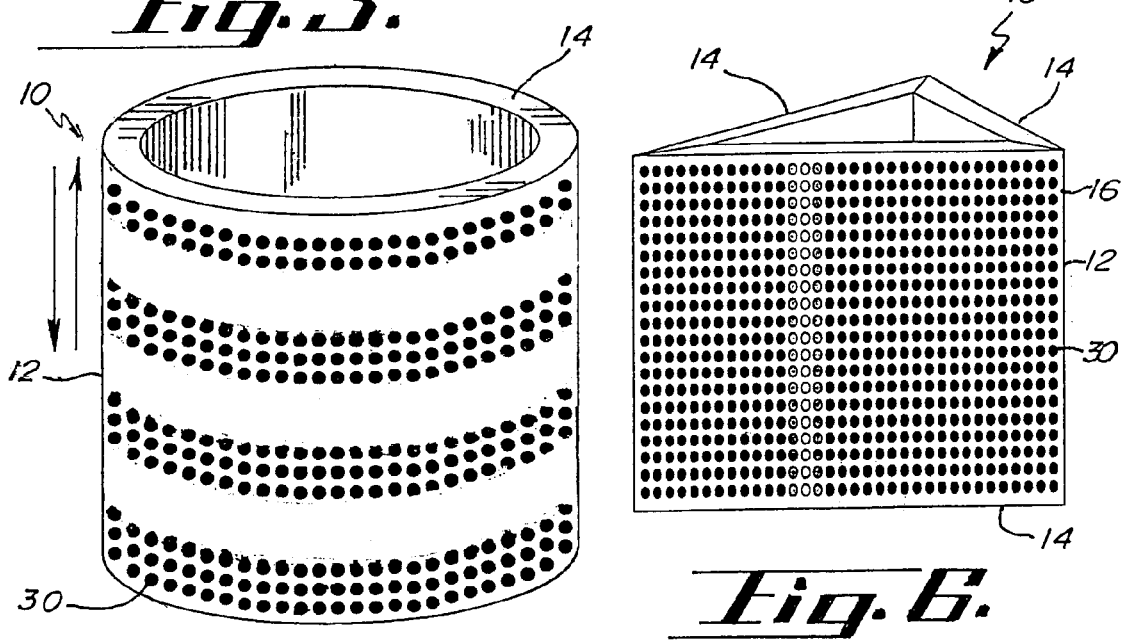
*Fig.5.*  *Fig.6.*

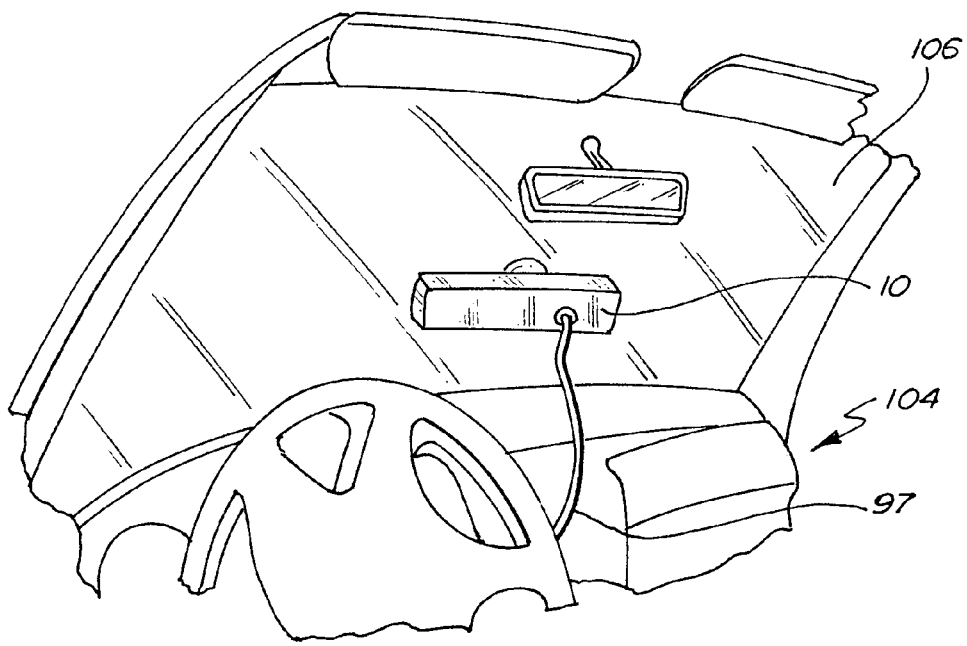
Fig. 13.
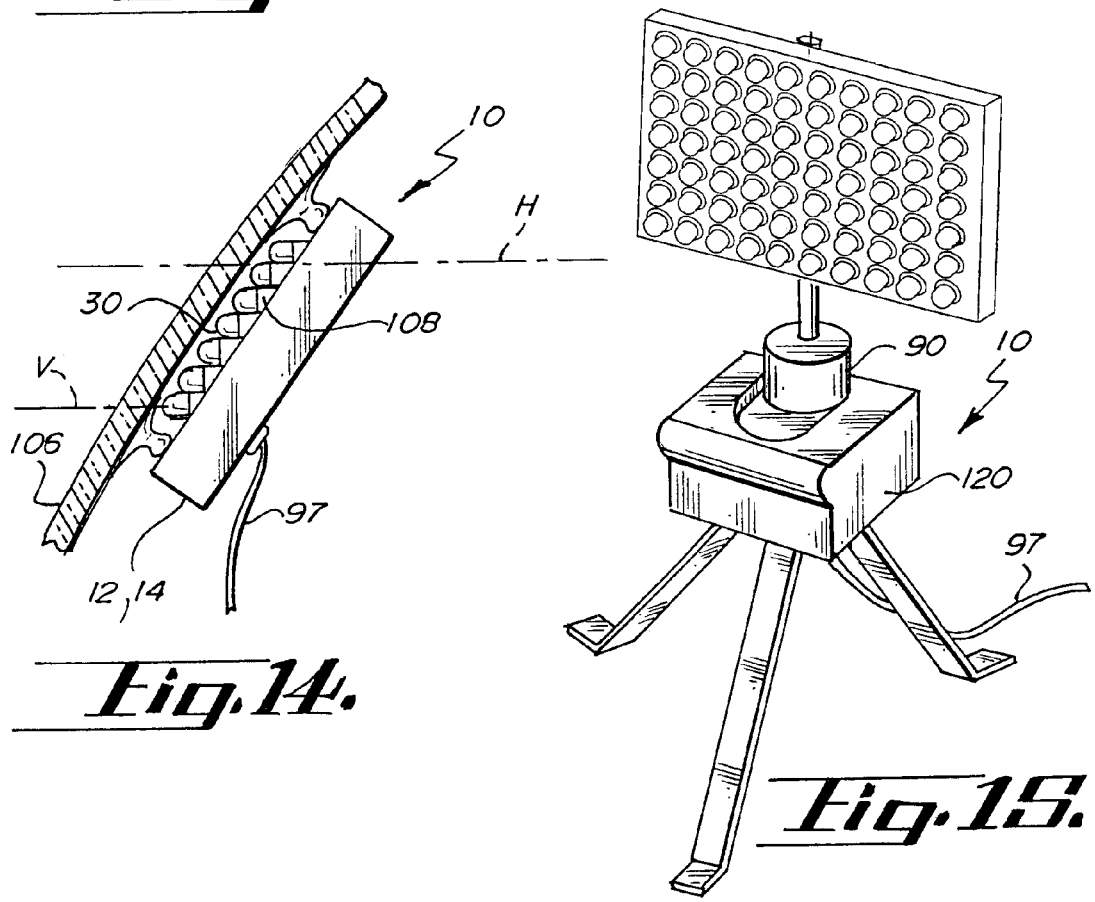
Fig. 14.
Fig. 15.

LED WARNING SIGNAL LIGHT AND LIGHT BAR

This is application is a Continuation application from Ser. No. 09/169,871, filed Oct. 12, 1998 now abandoned which is based upon Provisional U.S. Patent Application No. 60/062,559, filed Oct. 21, 1997, and Provisional U.S. Patent Application No. 60/094,803 filed Jul. 31, 1998, the entire contents of which are hereby incorporated by reference.

BACKGROUND OF THE INVENTION

Light bars or emergency lights of the type used on emergency vehicles such as fire trucks, police cars, and ambulances, utilize warning signal lights to produce a variety of light signals. These light signals involve the use of various colors and patterns. Generally, these warning signal lights consist of revolving and oscillating lamps having reflective back support members and colored filters as depicted in U.S. Pat. No. 5,091,828.

Many problems exist with the known methods for producing warning light signals. One particular problem with known light bars is their reliance on mechanical components to revolve or oscillate the lamps to produce the desired light signal. Additionally, these components increase the size of the light bar or emergency lights which adversely affect its drag characteristics. Moreover, there is an increased likelihood that a breakdown will occur requiring the repair or replacement of the defective component.

The most common light sources being used in light bars or emergency lights include halogen lamps or gaseous discharge xenon lamps. These lamps emanate large amounts of heat which is difficult to dissipate from the sealed light bar or emergency light and may damage the electronic circuitry contained therein. In addition, these lamps consume large amounts of current requiring a large power supply or large battery or electrical source. These lamps also generate substantial electromagnetic emissions which may interfere with radio communications. Finally, these lamps, which are not rugged, have relatively short life spans necessitating frequent replacement.

Another problem with the known warning signal lights is their use of filters to produce the desired color. This filtering technique produces more heat that must be dissipated. Moreover, changing the color of a light source requires the physical removal of the filter from the light bar or emergency light and the insertion of a new filter. Furthermore, filters fade or flake making them unable to consistently produce the desired color.

These problems associated with traditional signaling lamps are exacerbated by the fact that creating multiple light signals requires multiple signaling lamps. Further, there is little flexibility in modifying the light signal created by a lamp. For example, changing a stationary lamp into one that rotates or oscillates would require a substantial modification to the light bar which may not be possible.

In view of the above, there is a need for a warning signal light that: (1) is capable of producing multiple light signals; (2) producing the appearance of a revolving or oscillating light signal without relying upon mechanical components; (3) generates little heat; (4) uses substantially less electric current; (5) produces significantly lessor amounts of electromagnetic emissions; (6) is rugged and has a long life span; and (7) produces a truer light output color without the use of filters.

SUMMARY OF THE INVENTION

According to the invention, there is provided a light emitting diode (LED) warning signal light which may be depicted in several embodiments. In general, the warning signal light comprises an array of light sources configured on a light support and in electrical communication with a controller and a power supply, battery, or other electrical source. The warning signal light provides various colored light signals for use by an emergency vehicle. These light signals may include a stationary light, a strobe light, a revolving light, and an oscillating light. Additionally, the warning signal light may be capable of displaying symbols, characters, or arrows. Preferably, rotating and oscillating light signals are produced by sequentially illuminating columns of LED's on a stationary light support. However, the warning signal light may also be rotated or oscillated via mechanical means. The warning signal light may also be transportable for easy connection to a stand such as a tripod for electrical connection to a power supply, battery, or other electrical source as a stand-alone signal.

An object of an embodiment of the invention is to provide a warning signal light capable of producing revolving and oscillating light signals without the use of mechanical components.

Another object of an embodiment of the invention is that the warning signal light is capable of producing several different light signals.

Yet another object of an embodiment of the invention is to generate substantially less heat than traditional warning signal lights.

Yet another object of an embodiment of the invention is to use substantially less electric current.

Still another object of an embodiment of the invention is to produce relatively lower amounts of electromagnetic emissions.

Another object of an embodiment of the invention is to be rugged and have a relatively longer life span than traditional warning signal lights.

Yet another object of an embodiment of the invention is to produce a truer light output color without the use of filters.

Still another object of an embodiment of the invention is to allow the user to adjust the color of the light signal without having to make a physical adjustment from a multi-colored panel.

Another object of an embodiment of the invention is that it can be formed into various shapes. This allows the invention to be customized for the particular need.

Yet another object of an embodiment of the invention is that the light signal produced can be easily customized by the user via a microprocessor.

A feature of an embodiment of the invention is a plurality of light emitting diodes (LED's), integral to a circuit board, where the LED's are aligned in vertical columns and horizontal rows.

Another feature of an embodiment of the invention is the mounting of a panel of LED's to a mechanical device which rotates or oscillates the panel during use as a warning signal light on an emergency vehicle.

Yet another feature of an embodiment of the invention is the provision of a plurality of LED's mounted to a flexible circuit board which may be manipulated into any desired configuration and can be used as a stationary, rotating, or oscillating signal light by an emergency vehicle.

Still another feature of an embodiment of the invention is the provision of a microprocessor/controller which is in electrical communication with a panel of LED's to selectively activate the LED's to produce a revolving or oscillating light signal.

Yet another feature of an embodiment of the invention is the provision of an LED support member supporting an array of colored LED's and a controller capable of selecting LED's of the same color to produce a single or mixed colored light signal.

Still another feature of an embodiment of the invention is the provision of a light emitting diode support member having an array of LED's disposed about a front surface consisting of at least two sides and a controller capable of producing light signals on each side that are independent of each other.

Still another feature of an embodiment of the invention is the provision of an LED support member having an array of LED's angularly offset with respect to the LED support member for the provision of a horizontal light signal as viewed by an individual when the LED support member is mounted within the interior of the forward or rear windshield of a vehicle.

Still another feature of an embodiment of the invention is the provision of an LED support member which may be easily connectable and/or removed from a transportable support such as a tripod for placement of an LED warning signal light at any location as desired by an individual.

Still another feature of an embodiment of the invention is the provision of an LED support member which may be easily connectable to an emergency vehicle, including but not limited to automobiles, ambulances, trucks, motorcycles, snowmobiles, and/or any other type of vehicle in which warning signal or emergency lights are utilized.

BRIEF DESCRIPTION OF THE DRAWINGS

FIG. 3 is a perspective view of a warning signal light attached to a gyrator according to an embodiment of the invention.

FIG. 5 is a perspective view of a warning light signal according to an embodiment of the invention depicting sequential activation of rows of LED's.

FIG. 6 is a perspective view of a warning light signal according to an embodiment of the invention.

FIG. 13 is a perspective detail view of a warning signal light attached to the interior of a windshield of an emergency vehicle.

FIG. 14 is a side plan view of a warning signal light mounted to an interior surface of an emergency vehicle window having auxiliary offset individual LED light sources.

FIG. 15 is an environmental view of a warning signal light as engaged to a remote support device such as a tripod.

DETAILED DESCRIPTION OF THE PREFERRED EMBODIMENTS

Figure 1:
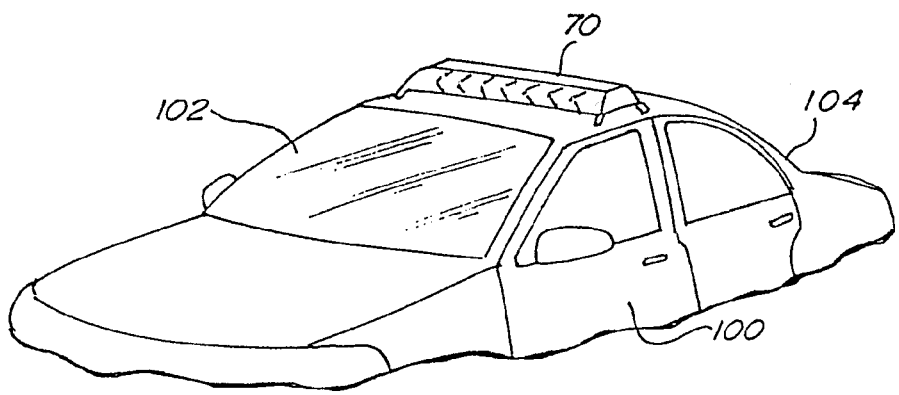
FIG. 1 is a partial perspective view of an emergency vehicle equipped with a light bar containing warning signal lights according to an embodiment of the invention.
Figure 2:
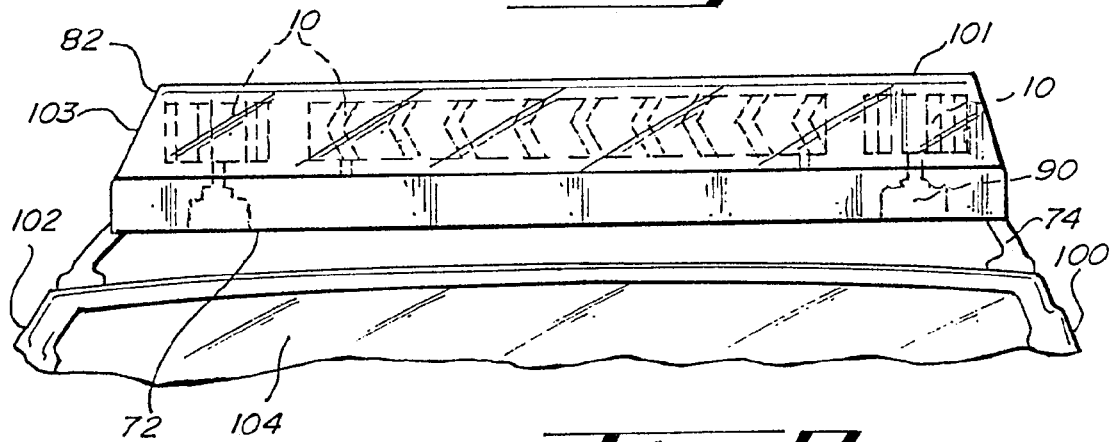
FIG. 2 is a partial front elevational view of an emergency vehicle equipped with a light bar containing warning signal lights according to an embodiment of the invention.
Figure 4:
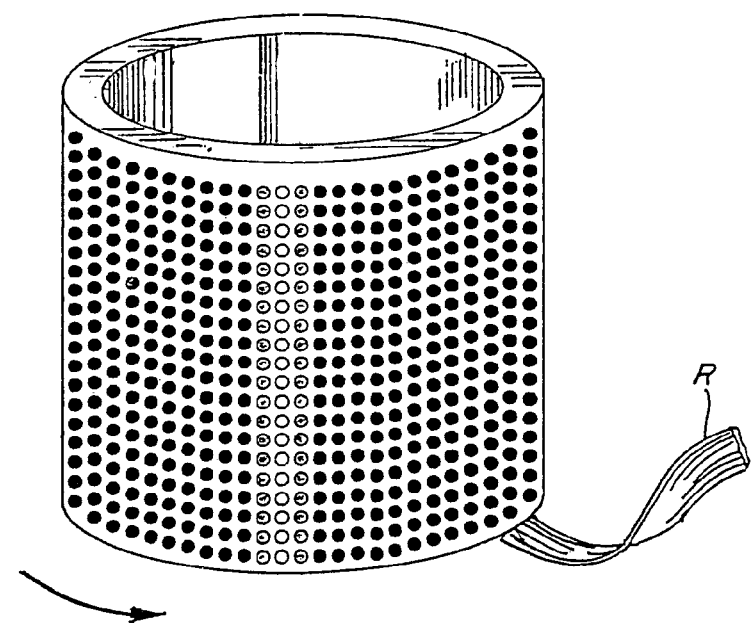
FIG. 4 is a perspective view of a warning signal light according to an embodiment of the invention depicting the sequential activation of columns of light emitting diodes (LED's).

A warning signal light according to the principles of this invention is indicated generally as 10. FIGS. 1 and 2 depict light bar 70 mounted to an emergency vehicle 104. Light bar 70 includes base 72, mounting means 74, cover 82, and warning signal lights 10. Also included in light bar 70 are gyrators 90 used to impart motion to warning signal lights 10.

Figure 9:
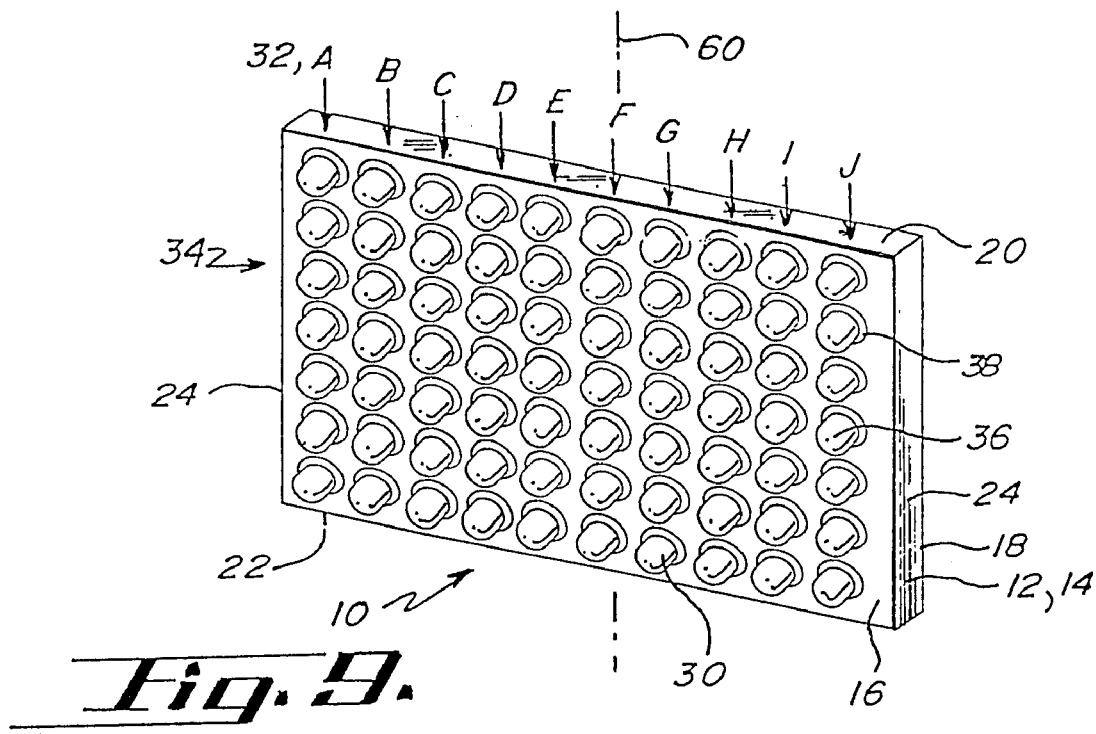
FIG. 9 is a perspective view of a warning signal light according to an embodiment of the invention.

Referring to FIGS. 3 and 9, warning signal light 10 comprises light support 12, light sources 30, controller 50 (shown in FIG. 11), and connecting portion 40 for attaching the warning signal light to light bar 70 or gyrator 90. The warning signal light 10 operates to create a warning signal for use by an emergency vehicle by selectively activating light sources 30 using controller 50.

Figure 7:
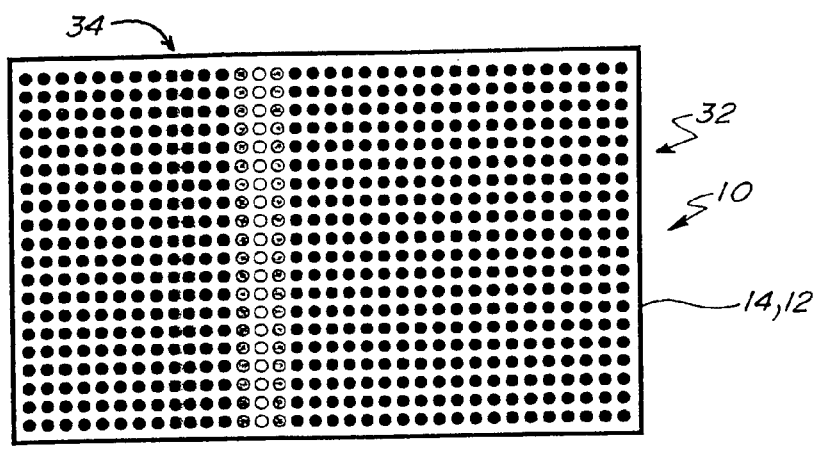
FIG. 7 is a perspective view of a warning light signal according to an embodiment of the invention.

Light sources 30 are preferably light emitting diodes (LED's) and are generally arranged in aligned columns 32 and rows 34 as shown in FIGS. 7 and 9. Each of the light emitting diodes (LED's) may have shoulder portion 38 adjacent LED support 12 and dome 36. LED's 30 are situated to be in electric communication with controller 50 and a power supply, a battery, or power source. The use of light emitting diodes (LED's) instead of the traditional halogen or gaseous discharge xenon lamps results in a reduction of heat generation, current draw, and electromagnetic emissions, while increasing lamp life and producing a more true output light color.

Figure 11A:
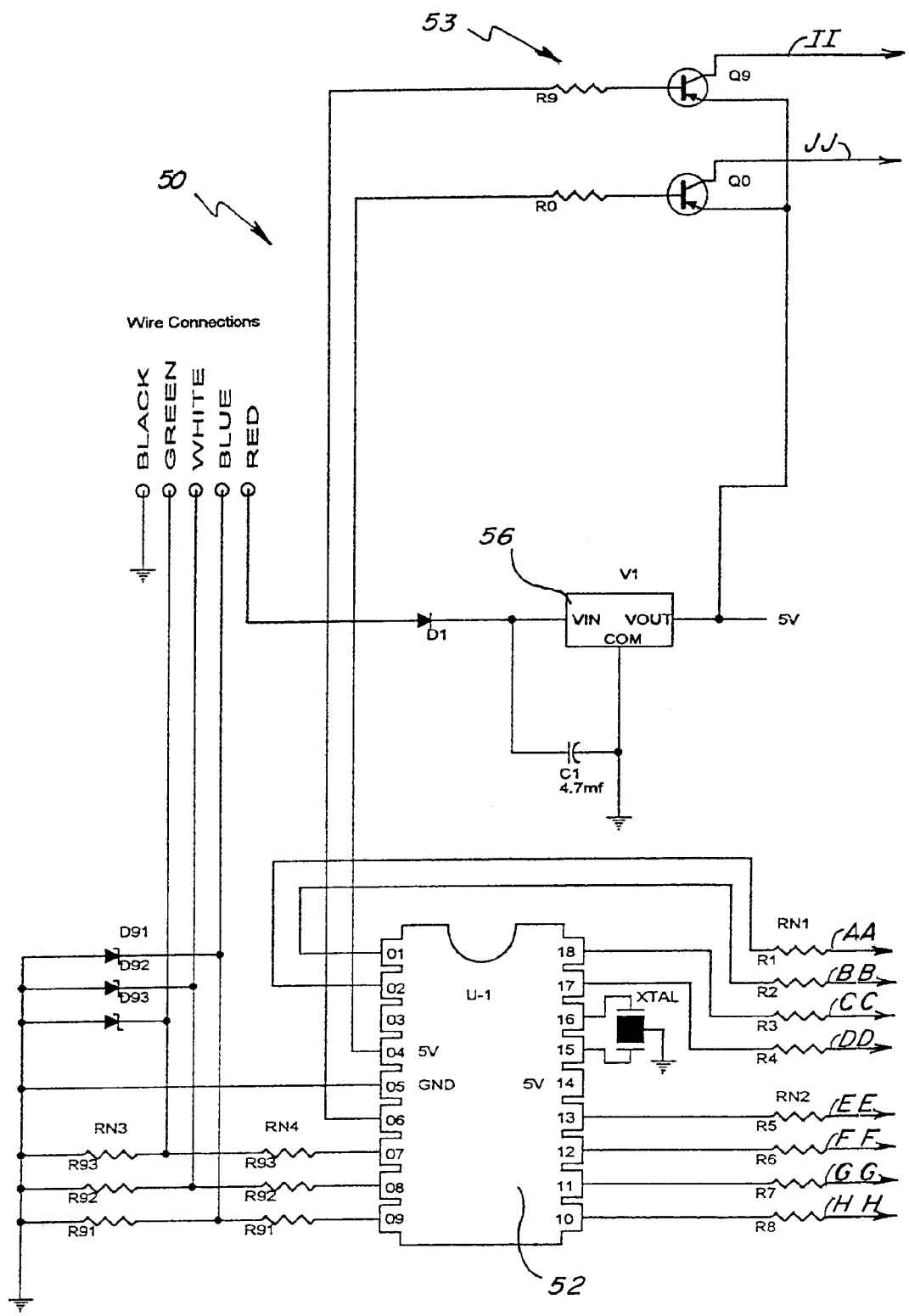
FIG. 11 is a schematic diagram of the controller circuitry in accordance with an embodiment of the invention.
Figure 11B:
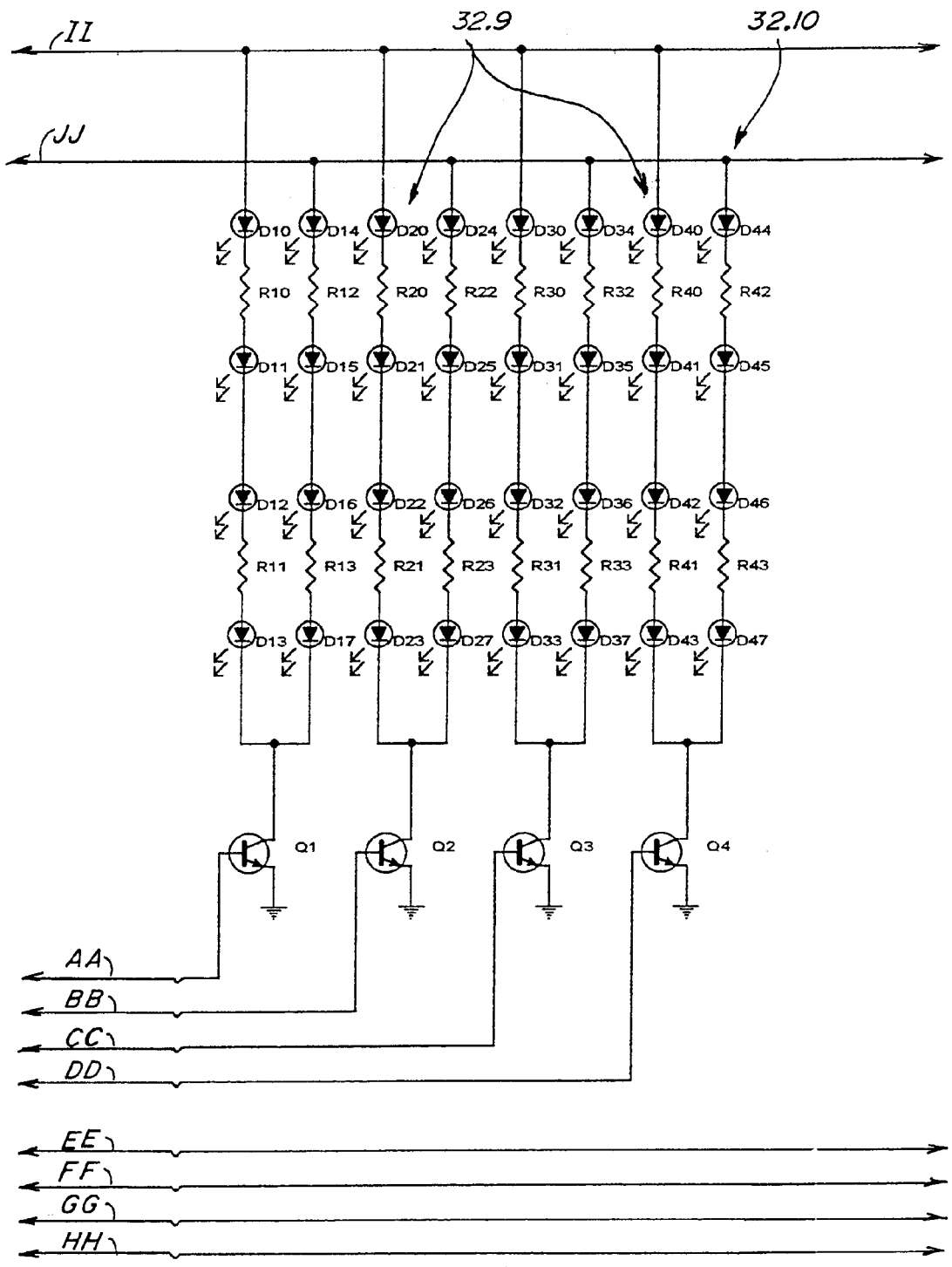
Figure 11C:
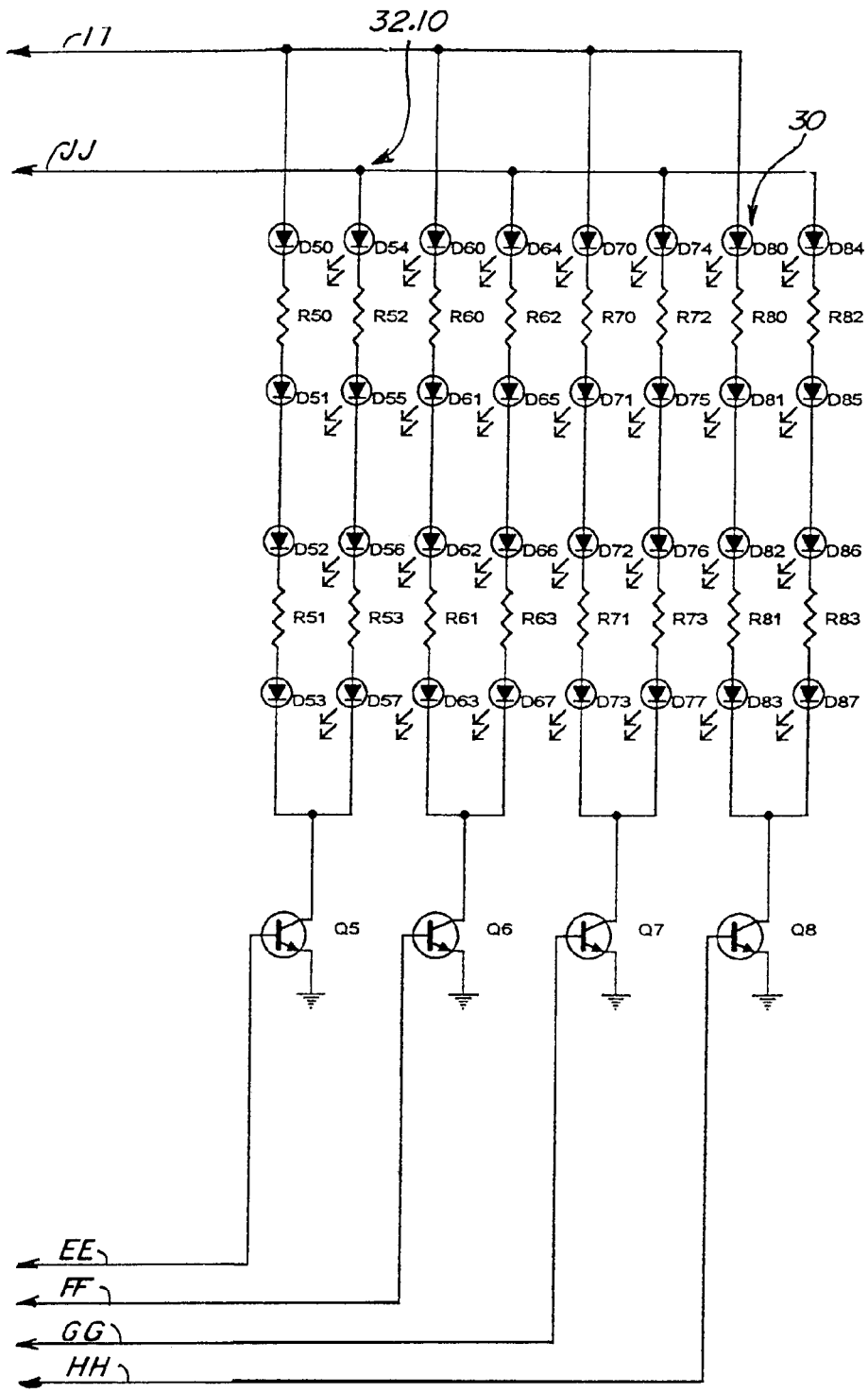

Controller 50, is used to selectively activate columns 32, rows 34, or individual LED's 30, to create a constant light signal, a strobe light signal, a flashing light signal, the illusion of a rotating or an oscillating light signal, a reverse character message, or images such as arrows. FIG. 11 shows an embodiment of controller 50 capable of selectively activating columns 32, rows 34 or individual LED's 30. Controller 50 generally comprises microprocessor 52 and circuitry 53 and is preferably contained within, attached to, or an element of, LED support 12. It is envisioned that controller 50 be programmed by an external controller and powered through cable R.

In a preferred embodiment, controller 50 generally comprises circuit board 54 having microprocessor 52 attached to a low voltage power supply, battery, or electrical source 56. Microprocessor 52 is configured through circuitry 53 to selectively activate columns of LED's 30. Transistors Q9 and Q10 are in electronic communication with microprocessor 52, power supply, battery, or electrical source 56, and their respective columns 32.9 and 32.10 of LED's 30. Columns 32 of LED's 30 are connected to transistors Q1–Q8, which are in turn connected to microprocessor 52 through resistors R1–R8. Microprocessor 52 is capable of selectively activating transistors Q1–Q8 to allow current flowing through transistors Q9 and Q-10 to activate the selected column 32 of LED's 30. This circuit is capable of producing a revolving, oscillating, or flashing light signal.

In the preferred embodiment, a rotating or oscillating light signal is preferably established by the sequential illumination of entire columns 32 of LED's 30 turning a desired number of columns on and then sequentially illuminating one additional column 32 while turning another column 32 off. Alternatively, the rotating or oscillating light signal may be created by selectively activating columns 32 of LED's 30. The following algorithm may be used to provide a counter-clockwise revolving light signal (FIG. 9):

1) column A is activated at 0% duty cycle (column A 0%), column B 0%, column C 0%, column D 0%, column E 0%, column F 0%, column G 0%, column H 0%, column I 0%, and column J 0%;
2) column A 25%, column B 0%, column C 0%, column D 0%, column E 0%, column F 0%, column G 0%, column H 0%, column I 0%, and column J 0%;
3) column A 50%, column B 25%, column C 0%, column D 0%, column E 0%, column F 0%, column G 0%, column H 0%, column I 0%, and column J 0%;
4) column A 75%, column B 50%, column C 25%, column D 0%, column E 0%, column F 0%, column G 0%, column H 0%, column I 0%, and column J 0%;
5) column A 100%, column B 75%, column C 50%, column D 25%, column E 0%, column F 0%, column G 0%, column H 0%, column I 0%, and column J 0%;
6) column A 100%, column B 100%, column C 75%, column D 50%, column E 25% column, column F 0%, column G 0%, column H 0%, column I 0%, and column J 0%;;
7) column A 75%, column B 100%, column C 100%, column D 75%, column E 50%, F 25%, column G 0%, column H 0%, column I 0%, and column J 0%;
8) column A 50%, column B 75%, column C 100%, column D 100%, column E 75%, column F 50%, column G 25%, column H 0%, column I 0%, and column J 0%;
9) column A 25%, column B 50%, column C 75%, column D 100%, column E 100%, column F 75%, column G 50%, column H 25%, column I 0%, and column J 0%;
10) column A 0%, column B 25%, column C 50%, column D 75%, column E 100%, column F 100%, column G 75%, column H 50%, column I 25%, and column J 0%;
11) column A 0%, column B 0%, column C 25%, column D 50%, column E 75%, column F 100%, column G 100%, column H 75%, column I 50%, and column J 25%;
12) column A 0%, column B 0%, column C 0%, column D 25%, column E 50%, column F 75%, column G 100%, column H 100%, column I 75%, and column J 50%;
13) column A 0%, column B 0%, column C 0%, column D 0%, column E 25%, column F 50%, column G 75%, column H 100%, column I 100%, and column J 75%;
14) column A 0%, column B 0%, column C 0%, column D 0%, column E 0%, column F 25%, column G 50%, column H 75%, column I 100%, and column J 100%;
15) column A 0%, column B 0%, column C 0%, column D 0%, column E 0%, column F 0%, column G 25%, column H 50%, column I 75%, and column J 100%;
16) column A 0%, column B 0%, column C 0%, column D 0%, column E 0%, column F 0%, column G 0%, column H 25%, column I 50%, and column J 75%;
17) column A 0%, column B 0%, column C 0%, column D 0%, column E 0%, column F 0%, column G 0%, column H 0%, column I 25%, and column J 50%;
18) column A 0%, column B 0%, column C 0%, column D 0%, column E 0%, column F 0%, column G 0%, column H 0%, column I 0%, and column J 25%;
19) column A 0%, column B 0%, column C 0%, column D 0%, column E 0%, column F 0%, column G 0%, column H 0%, column I 0%, and column J 0%;
20) return to step 1).

A clockwise revolving light signal is created by performing steps 1–19 in descending order then repeating the steps. An oscillating light signal is created by performing: (a) steps 7 through 16 in ascending order; (b) steps 7 through 16 in descending order; and (c) repeating (a) and (b).

A second embodiment of controller 50 provides a means for activating LED's 30 individually to allow for greater flexibility in the type of light signal created. This embodiment of the invention is capable of displaying information in different colors or patterns. Depending on the size of the display, it may be necessary to scroll the symbols or characters across the display to accommodate for a larger visual appearance. It is envisioned that the mirror image of patterns, symbols, or characters could be displayed making the message easily readable by drivers viewing it in their rear view mirror. It is also envisioned that this embodiment of the invention could display arrows indicating a direction the viewer is to travel or other images as shown in FIG. 2. In addition, combinations of signaling lights, direction arrows, and other information carrying signals or images, could be displayed simultaneously by the invention.

LED support 12 is envisioned to have several embodiments. One embodiment, shown in FIG. 9, consists of a panel 14 having front 16, back 18, top 20, bottom 22 and sides 24. LED's 30 are arranged on front 16, with domes 36 extending therefrom, in columns 32 and rows 34. LED's 30 are in electric communication with controller 50 which may be contained or sealed within LED support 12 to provide protection from the elements. In addition, panel 14 may be circuit board 54 of controller 50.

Figure 10:
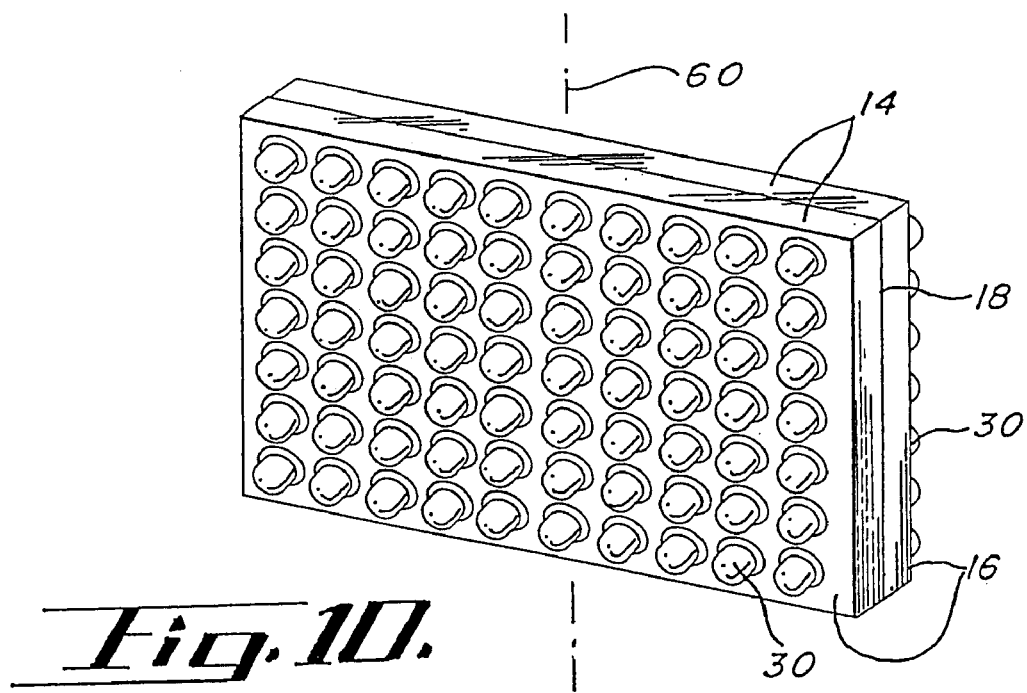
FIG. 10 is a perspective view of a warning signal light according to an embodiment of the invention.

Another embodiment of warning signal light 10 is depicted in FIG. 10. Here, the backs 18 of two panels 14 are attached together to allow for a light signal to be produced on two sides. The two panels form LED support 12. Alternatively, it is envisioned that a single panel 14 having LED's arranged about front 16 and back 18 could be used as well.

Figure 8:
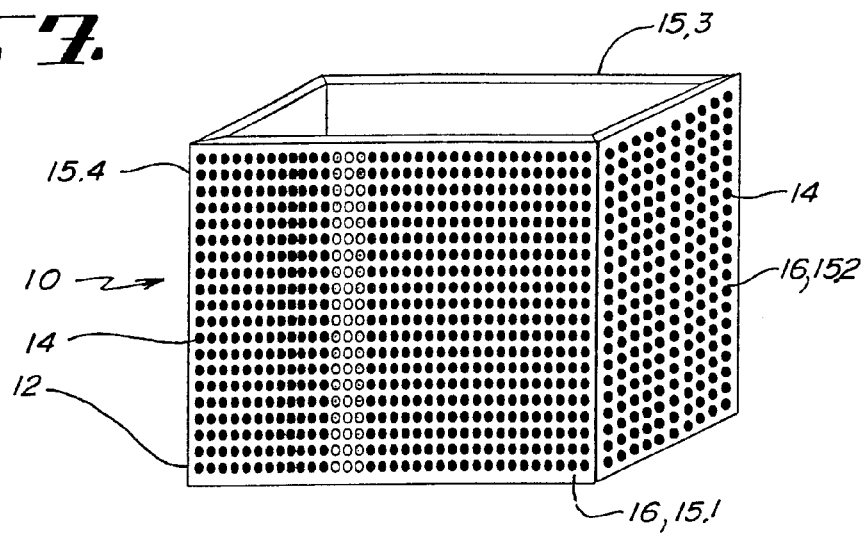
FIG. 8 is a perspective view of a warning light signal according to an embodiment of the invention.

FIGS. 6 and 8 show further embodiments of warning signal light 10. In FIG. 8, panels 14 are used to form an LED support 12 shaped as a square cylinder. FIG. 6 shows panels 14 connected to form a triangular cylinder. In both embodiments, LED's 30 are arranged about the fronts 16 of the panels 14. It is further envisioned that panels 14 may be integral to each other.

Figure 12:
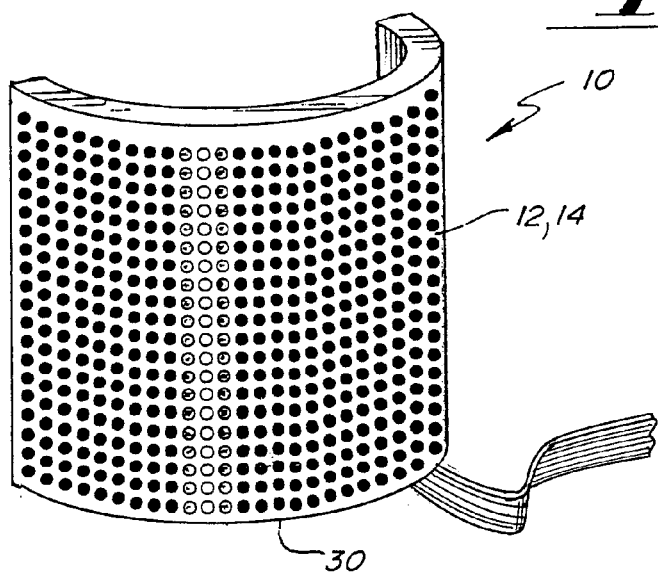
FIG. 12 is a perspective view of a warning signal light according to an embodiment of the invention.

Yet another embodiment of warning signal light 10, consists of a flexible panel 14 and controller 50 to allow LED support 12 to be formed into various shapes. FIG. 5 shows LED support 12 formed into a circular cylinder. Further variations include the use of flexible panels 14 to form other shapes such as semicircles (FIG. 12) or to simply conform to a surface of an emergency vehicle (FIGS. 13 and 14). This embodiment is particularly useful for undercover vehicles which generally position the warning signal lights inside the vehicle. For example, panel 14 could be attached to the front, rear, or side window of an undercover police car (FIG. 15).

It should be noted that numerous other shapes could be formed from panels 14 including those formed from combinations of flat, curved, and flexible panels at the preference of an individual.

In each of the embodiments discussed above, the array of LED's 30 may comprise the same or differently colored LED's. Generally, each column may consist of a series of differently colored LED's. Controller 50 can be configured to select the color LED to utilize in forming the light signal. Accordingly, the user may select that a blue, red, white, yellow, green, amber, or combination thereof be used as the color of light signal.

It is also envisioned that the controller 50 may control warning signal lights 10 having multiple sides (FIGS. 5, 6, 8, and 10) such that each side is capable of producing light signals that are independent from those produced by the other sides. For example, the square cylinder warning signal light shown in FIG. 8 may produce a red revolving light on first side 15.1, while second side 15.2 is simultaneously producing a blue oscillating light, while third side 15.3 is producing a stationary white light, and while fourth side 15.4 is producing a white strobe light.

Another embodiment of warning signal light 10 is depicted in FIGS. 1 and 2 as light bar 70 which extends from driver side 100 to passenger side 102 of emergency vehicle 104. Cover 82 protects light bar 70 from the elements. Each side of light bar 70 may have LED's 30 to produce light signals on each side of emergency vehicle 104. Furthermore, controller 50 is used to create multiple light signals on each side of light bar 70. For example, controller 50 could create a revolving blue light positioned at front passenger side 102 of light bar 70, oscillating white lights positioned at front driver side 100, and yellow arrows therebetween. Additional light signals may be produced out the back and sides of light bar 70. It is further envisioned that light bar 70 may consist of a single large array of LED's 30 across each side (not shown). This embodiment provides the largest display and, therefore, is best suited to display combinations of warning lights and images.

Mechanical rotation and oscillation of warning signal lights 10 about axis A is possible by way of attachment to gyrator 90 depicted in FIG. 3. Gyrator 90 mounted to light bar 70, generally comprises electric motors 96 having cables 97. Gyrator 90 is configured to receive connecting portion 40 of warning signal light 10. Cable 97 connects to a power supply and either an external controller or controller 50.

Gyrator 90 may be capable of rotating or oscillating warning signal light 10 about a single or dual axis of rotation A. FIG. 3 shows gyrator 90 configured to rotate or oscillate warning signal light 10 about a vertical axis A by way of motor 96.1 and oscillate warning signal light 10 about a horizontal axis A by way of motor 96.2. Rotation or oscillation of warning signal light 10 about vertical axis A is accomplished through direct attachment of connecting portion to motor 96.1. Oscillation of warning signal light 10 about horizontal axis A is accomplished by attaching swivel arm 99 to bracket 99.1 and post 99.2 which is mounted to motor 96.2.

Alternative methods for imparting rotation or oscillation of warning signal light 10 can be accomplished through the use of electric motors, toothed gears, and worm gears. In addition, maintaining an electronic communication between a power supply and an external controller with a revolving or oscillating warning signal light 10 can be accomplished using brushes or other means without sacrificing the operation of the warning signal light 10.

In another embodiment as depicted in FIGS. 13 and 14, emergency vehicle 104 may include a front or rear windshield 106. The front or rear windshield 106 is generally angularly offset with respect to the vehicle at an approximate angle of 45 degrees. In this embodiment, the mounting of a panel 14 of light sources 30 in flush contact with the interior of a front or rear windshield 106 occurs through the use of angular offsets 108 for the light sources 30 such that light emitted from the light sources 30 occur at a horizontal visual line (V) which is substantially parallel to the plane of a vehicle and not at an approximate angle of 45 degrees upward which corresponds to the angle of incident for the front or rear windshield 106.

In this embodiment, the ease of visualization of the light source 30 is significantly enhanced by the downward angular offsets 108 which position the light sources 30 along parallel visual lines of sight (V). LED supports 12 or panels 14 may then be positioned in any desired location within the interior of a vehicle in flush contact or proximate to the front or rear windshield 106. A suitable cable 97 is naturally required to provide electrical power for illumination of the light sources 30. It should be noted that the angle of incidence for the angular offsets 108 may vary considerably dependent upon the make or model for the vehicle to include the warning signal lights 10.

It should be further noted that the warning signal light 10 may be used with an automobile, motorcycle, snowmobile, personal watercraft, boat, truck, fire vehicle, helicopter, and/or any other type of vehicle receptive to the use of warning signal lights 10. It should be further noted that LED support 12 or panel 14 may be mounted to the interior top dashboard of a vehicle proximate to the front windshield 106 or to the interior top rear dashboard proximate to the rear windshield 106 of a vehicle.

Mounting of a light support 12 or panel 14 to either the front or rear dashboards may minimize the necessity for inclusion of angular offset 108 for the light sources 30. It should be further noted that LED supports 12 or panels 14 may be releasably affixed to the interior of the front or rear windshields 106 via the use of suction cups, hook-and-loop fabric material such as Velcro®, and/or any other releasable affixation mechanism at the preference of an individual. An individual may then adjust and reposition the location of the light support 12 or panels 14 within the interior of a vehicle as desired for maximization of visualization of the warning signal lights 10.

In another alternative embodiment as depicted in FIG. 15, warning signal light 10 may function as a remote, revolving, or stationary beacon. In this embodiment, LED support 12 or panel 14 is preferably releasably connected to a transportable support 120 via the use of a bracket. The transportable support 120 may be a tripod having telescoping legs or may be any other type of support as preferred by an individual. In this embodiment, LED support 12 or panel 14 is electrically connected to an elongate electrical extension cable 97 which may include any desired adapter for electrical communication with the electrical system of a vehicle. The remote light support 12 or panel 14 may also include plug-in adapters for electrical connection to any desired electrical power source other than a vehicle as is available.

The transportable support 120 may also include gyrator 90 as earlier described to provide a desired rotational or oscillatory motion for warning signal light 10. A controller 50 having a microprocessor 52 may also be integral to or in electrical communication with LED's 30 for the provision of multi-colored lights, flashing, or moving characters as desired by an individual. In this embodiment, the warning signal light 10 may be physically separated from an emergency vehicle any desired distance to facilitate or enhance the safety of a potentially dangerous situation necessitating the use of warning signal lights 10. In addition, it should be noted that a series of remote warning signal lights 10 may be electrically coupled to each other for any desired distance to again facilitate the safety of a situation necessitating the use of warning signal lights 10.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A multiple warning signal light for use with a motorized vehicle, the multiple warning signal light comprising:
   a) a light bar having a front side with a first visible exterior surface;
   b) a plurality of light emitting diodes arranged about and attached to the first visible exterior surface; and
   c) a controller in electric communication with the light emitting diodes, the controller constructed and arranged to activate the light emitting diodes thereby producing more than two different types of visually distinct warning light signals, wherein the more than two different types of visually distinct warning light signals are produced simultaneously, said light emitting diodes receiving power from a power source.

2. The multiple warning signal light of claim 1, said light bar further comprising a back side having a second visible exterior surface having a plurality of light emitting diodes arranged about and attached to said second visible exterior surface.

3. The multiple warning signal light of claim 2, wherein the controller independently controls the light emitting diodes on the first visible exterior surface and second visible exterior surface for the provision of different warning light signals on the first visible exterior surface and second visible exterior surface.

4. The multiple warning signal light of claim 3, the controller having a microprocessor.

5. The multiple warning signal light of claim 4, said plurality of light emitting diodes comprising light emitting diodes of at least two different colors.

6. The multiple warning signal light of claim 5, the controller activating the light emitting diodes to create at least one of a single colored warning light signal and at least one of a multicolored warning light signal.

7. The multiple warning signal light of claim 6, the light bar constructed and arranged to be formed into a plurality of shapes.

8. The multiple warning signal light of claim 6, wherein the warning light signals are selected from the group consisting of: a revolving light, an alternating light, an oscillating light, a flashing light, a stroboscopic light and any combinations thereof.

9. The multiple warning signal light of claim 6, wherein the plurality of light emitting diodes are in the form of an array.

10. The multiple warning signal light of claim 6, wherein the plurality of light emitting diodes are illuminated to create the appearance of rotation.

11. The multiple warning signal light of claim 6, wherein the plurality of light emitting diodes are illuminated to create the appearance of multi-colored rotation.

12. The multiple warning signal light of claim 6, the controller activating the light emitting diodes to create a plurality of visually distinctive warning light signals.

13. The multiple warning signal light of claim 9, wherein the warning light signal is a directional indicator.

14. The multiple warning signal light of claim 6, further comprising a programmable external controller for programming said controller.

15. The multiple warning signal light of claim 6, wherein the motorized vehicle is a utility vehicle.

16. The multiple warning signal light of claim 6, wherein the motorized vehicle is an emergency vehicle.

17. A multiple warning signal light for use with a motorized vehicle, the multiple warning signal light comprising:
   a) a light bar having a front side with a first visible exterior surface, the front side characterized as being planar;
   b) a plurality of light emitting diodes arranged about and attached to the first visible exterior surface; and
   c) a controller in electric communication with the light emitting diodes, the controller constructed and arranged to activate the light emitting diodes thereby producing more than two different types of visually distinct warning light signals, wherein the more than two different types of visually distinct warning light signals are produced simultaneously, said light emitting diodes receiving power from a power source.

18. The multiple warning signal light of claim 17, said light bar further comprising a back side characterized as being planar, said back side having a second visible exterior surface having a plurality of light emitting diodes arranged about and attached to the second visible exterior surface.

19. The multiple warning signal light of claim 18, wherein the controller independently controls the light emitting diodes on said first visible exterior surface and said second visible exterior surface for the provision of different warning light signals on the first visible exterior surface and second visible exterior surface.

20. The multiple warning signal light of claim 19, the controller having a microprocessor.

21. The multiple warning signal light of claim 20, said plurality of light emitting diodes comprising light emitting diodes of at least two different colors.

22. The multiple warning signal light of claim 21, the controller activating the light emitting diodes to create at least one of a single colored light signal and at least one of a multi-colored light signal.

23. A multiple warning signal light for use with a motorized vehicle, the multiple warning signal light comprising:
   a) a light bar having a planar elongate front side with a first visible exterior surface;
   b) a plurality of light emitting diodes arranged about and attached to the first visible exterior surface; and
   c) a controller in electric communication with the light emitting diodes, the controller constructed and arranged to activate the light emitting diodes thereby producing more than two different types of visually distinct warning light signals, wherein the more than two different types of visually distinct warning light signals are produced simultaneously, said light emitting diodes receiving power from a power source.

24. The multiple warning light signal of claim 23, said light bar further comprising a planar elongate back side having a second visible exterior surface, said second visible exterior surface having a plurality of light emitting diodes arranged about and attached to the second visible exterior surface.

25. The multiple warning signal light of claim 24, wherein the controller independently controls the light emitting diodes on each of the first visible exterior surfaces and second visible exterior surface thereby providing each of the first visible exterior surface and the second visible exterior surface with at least one visually distinct warning light signal.

26. The multiple warning signal light of claim 25, the controller having a microprocessor.

27. The multiple warning signal light of claim 26, sad plurality of light emitting diodes comprising light emitting diodes of at least two different colors.

28. The multiple warning signal light of claim 27, the controller activating the light emitting diodes to create at least one of a single colored warning light signal and at least one of a multicolored warning light signal.

29. A multiple warning signal light for use with a motorized vehicle, the multiple warning signal light comprising:

a) a light bar having a front side with a visible exterior surface;

b) a plurality of light emitting diodes arranged about and attached to the visible exterior surface, said light emitting diodes being in the form of a flat array, the plurality of light emitting diodes being angled relative to the light bar such that the light output beam is horizontal; and c) a controller in electrical communication with the light emitting diodes, the controller constructed and arranged to activate the light emitting diodes thereby producing more than two different types of visually distinctive warning light signals, wherein the more than two different types of visually distinct warning light signals are produced simultaneously, said light emitting diodes receiving power from a power source.

30. The multiple warning signal light of claim 1, wherein the more than two different types of visually distinct warning light signals are produced independently of one another.

31. The multiple warning signal light of claim 1, wherein the light bar is a longitudinally extending elongate member.

32. A multiple warning signal light for use with a motorized vehicle, the multiple warning signal light comprising:

a) a light bar having a front side with a first visible exterior surface;

b) a plurality of light emitting diodes arranged about and attached to the first visible exterior surface; and c) a controller in electric communication with the light emitting diodes, the controller constructed and arranged to activate the light emitting diodes thereby producing more than two different types of visually distinct warning light signals, wherein the more than two different types of visually distinct warning light signals are produced in at least one combination, said light emitting diodes receiving power from a power source.

33. The multiple warning signal light of claim 32, said light bar further comprising a back side having a second visible exterior surface having a plurality of light emitting diodes arranged about and attached to said second visible exterior surface.

34. The multiple warning signal light of claim 33, wherein the controller independently controls the light emitting diodes on the first visible exterior surface and second visible exterior surface for the provision of different warning light signals on the first visible exterior surface and second visible exterior surface.

35. The multiple warning signal light of claim 32, the controller having a microprocessor.

36. The multiple warning signal light of claim 32, said plurality of light emitting diodes comprising light emitting diodes of at least two different colors.

37. The multiple warning signal light of claim 36, the controller activating the light emitting diodes to create at least one of a single colored warning light signal and at least one of a multi-colored warning light signal.

38. The multiple warning signal light of claim 32, the controller activating the light emitting diodes to create a plurality of visually distinctive warning light signals.

39. The multiple warning signal light of claim 32, further comprising a programmable external controller for programming said controller.

40. The multiple warning signal light of claim 32, wherein the motorized vehicle is a utility vehicle.

41. The multiple warning signal light of claim 32, wherein the motorized vehicle is an emergency vehicle.

42. The multiple warning signal light for use with a motorized vehicle, the multiple warning signal light comprising:

a) a light bar having a front side with a first visible exterior surface, the front side being characterized as being planar;

b) a plurality of light emitting diodes arranged about and attached to the first visible exterior surface; and c) a controller in electric communication with the light emitting diodes, the controller constructed and arranged to activate the light emitting diodes thereby producing more than two different types of visually distinct warning light signals, wherein the more than two different types of visually distinct warning light signals are produced in at least one combination, said light emitting diodes receiving power from a power source.

43. The multiple warning signal light of claim 42, said light bar further comprising a back side characterized as being planar, said back side having a second visible exterior surface having a plurality of light emitting diodes arranged about and attached to the second visible exterior surface.

44. The multiple warning signal light of claim 43, wherein the controller independently controls the light emitting diodes on said first visible exterior surface and said second visible exterior surface for the provision of different warning light signals on the first visible exterior surface and second visible exterior surface.

45. A multiple warning signal light for use with a motorized vehicle, the multiple warning signal light comprising:

a) a light bar having a planar elongate front side with a first visible exterior surface;

b) a plurality of light emitting diodes arranged about and attached to the first visible exterior surface; and c) a controller in electric communication with the light emitting diodes, the controller constructed and arranged to activate the light emitting diodes thereby producing more than two different types of visually distinct warning light signals, wherein the more than two different types of visually distinct warning light signals are produced in at least one combination, said light emitting diodes receiving power from a power source.

46. The multiple warning light signal of claim 45, said light bar further comprising a planar elongate back side having a second visible exterior surface, said second visible exterior surface having a plurality of light emitting diodes arranged about and attached to the second visible exterior surface.

47. The multiple warning signal light of claim 46, wherein the controller independently controls the light emitting diodes on each of the first visible exterior surface and second visible exterior surface thereby providing each of the first visible exterior surface and the second visible exterior surface with at least one visually distinct warning light signal.

48. A multiple warning signal light for use with a motorized vehicle, the multiple warning signal light comprising:

a) a light bar having a front side with a visible exterior surface;

b) a plurality of light emitting diodes arranged about and attached to the visible exterior surface, said light emitting diodes being in the form of a flat array, the plurality of light emitting diodes being angled relative to the light bar such that the light output beam is horizontal; and c) a controller in electrical communication with the light emitting diodes, the controller constructed and arranged to activate the light emitting diodes thereby producing more than two different types of visually distinct warning light signals, wherein the more than two different types of visually distinct warning light signals are produced in at least one combination, said light emitting diodes receiving power from a power source.

49. The multiple warning signal light of claim 32, wherein the more than two different types of visually distinct warning light signals are produced independently of one another.

50. The multiple warning signal light of claim 32, wherein the light bar is a longitudinally extending elongate member.

* * * * *